C. E. WHITCOMB.
SAP SPOUT.
APPLICATION FILED NOV. 12, 1914.
1,154,679.
Patented Sept. 28, 1915.
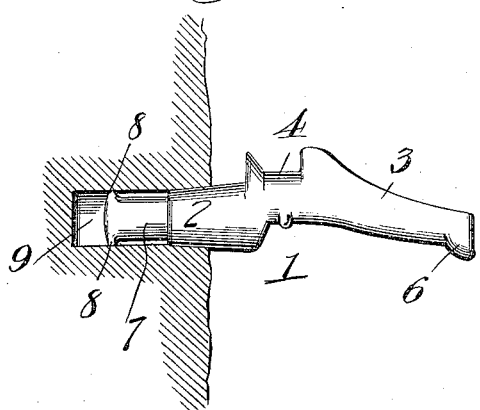
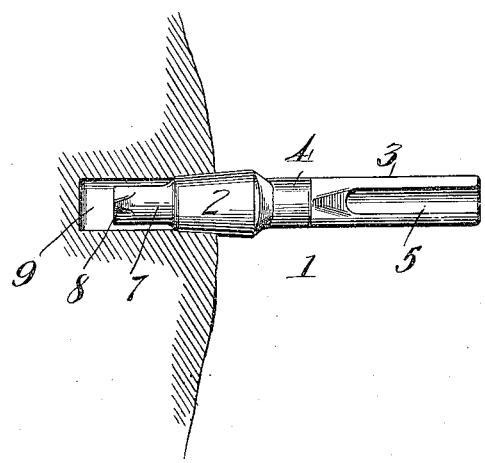
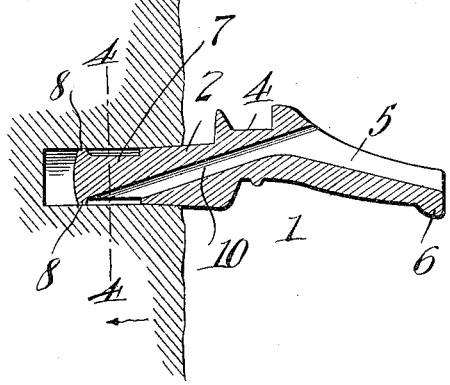
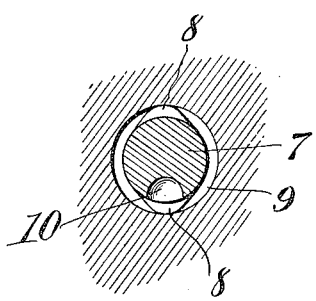
Witnesses
Inventor
C. E. Whitcomb
By E. B. Hocking
Attorney

UNITED STATES PATENT OFFICE.

CLARANCE E. WHITCOMB, OF RICHFORD, VERMONT.

SAP-SPOUT.

1,154,679. Specification of Letters Patent. Patented Sept. 28, 1915.

Application filed November 12, 1914. Serial No. 871,744.

*To all whom it may concern:*

Be it known that I, CLARANCE E. WHITCOMB, a citizen of the United States, residing at Richford, in the county of Franklin and State of Vermont, have invented certain new and useful Improvements in Sap-Spouts, of which the following is a specification, reference being had therein to the accompanying drawing.

This invention relates to certain new and useful improvements in sap spouts and has for its object, the provision of a spout having a passage so constructed that when the spout is in position within the hole of a tree, the air will be excluded therefrom so as to prevent the drying up of the tree which is the main difficulty now existing with sap spouts now in use.

Another object of the invention is to provide a sap spout which is exceedingly simple and cheap in construction and one which is provided with means for holding the same in position within the hole of a tree after being placed therein, so as to prevent the same from being pulled out of position by the weight of the bucket which is supported thereby.

Another object of the invention is to provide a spout having a bail-receiving portion so mounted, that the sap collected within the bucket can be poured out of the same without removing the bucket from the spout.

Other and further objects and advantages of the invention will be hereinafter set forth and the novel features thereof defined by the appended claim.

In the drawings—Figure 1, is a detail, vertical section through a portion of a tree showing in elevation, my improved construction of spout; Fig. 2, is a detail horizontal section through a portion of a tree showing in plan, my improved construction of spout; Fig. 3, is a view similar to Fig. 1, showing a longitudinal section through the spout; and Fig. 4, is a transverse section through the spout in position with a hole in a tree.

Like numerals of reference refer to like parts in the several figures of the drawings.

In carrying out my improved construction of sap spout, 1 indicates a body preferably angular in shape having a plug portion 2 and a trough portion 3 and an intermediate bucket-supporting portion 4. The trough portion 3 is cut out as shown at 5 to form a trough terminating in a lip 6 so as to cause the sap to drip into the bucket.

The plug portion 2 is annularly reduced as shown at 7 and is provided at its end with oppositely disposed lugs 8 adapted to engage the upper and lower walls of an opening 9 formed in a tree so as to hold the same firmly in position; the plug portion 2 completely closing the open end of the hole and it will be seen that by wedging the spout in position, the same will be firmly held, so that when weight is placed upon the outer portion of the spout by hanging the bail of the bucket upon the portion 4, which is provided with a recess formed by spaced lugs to prevent the same from slipping, the upper lug 8 will embed itself within the upper wall of the opening. Extending obliquely through the plug portion 2 of the body, is a passage 10 which intersects the groove of the trough 5 at its outer end and at its inner end comes out of the plug at the reduced portion 7 in such a manner that an inclined passage is formed which will hold a certain amount of sap at all times so as to exclude air, thereby preventing the tree from drying up when the plug is in position. It will be seen that the sap passage 10 has its inlet end adjacent the bottom of the hole bored in the tree so that the same is closed as soon as any sap accumulates, which has a free passage around the end of the plug, as clearly shown in Fig. 4. By constructing a plug in this manner, the hole bored in the tree can be slightly inclined without allowing the sap to entirely pass out of the spout so that all danger of the tree drying up by admitting air into the hole bored therein, is prevented, and a construction is formed which allows the sap which accumulates within the hole bored in the tree, to pass freely out through the sap passage into the trough from which it drops into the bucket.

From the foregoing description, it will be seen that I have provided a sap spout which is provided with a passage communicating with one of the circumferential walls of the reduced portion of the plug at such a point that the air is excluded as soon as any sap accumulates within the opening bored into the tree.

I claim:

A sap spout, comprising an angular shaped body having a plug portion at one end, a trough portion at its opposite end and an intermediate bucket-supporting portion, said trough portion terminating at a point in vertical alinement with the bucket portion, said plug portion being annularly reduced terminating in oppositely disposed lugs in vertical alinement, said plug portion having an obliquely arranged passage extending from the under side of the reduced portion thereof to the upper end of the trough, the upper end of the trough being in a horizontal plane with the top face of the reduced portion of said plug.

In testimony whereof I affix my signature in presence of two witnesses.

CLARANCE E. WHITCOMB.

Witnesses:
ARTHUR B. ROWLEY,
H. H. ROUNDS.

Copies of this patent may be obtained for five cents each, by addressing the "Commissioner of Patents, Washington, D. C."